Figure 1:
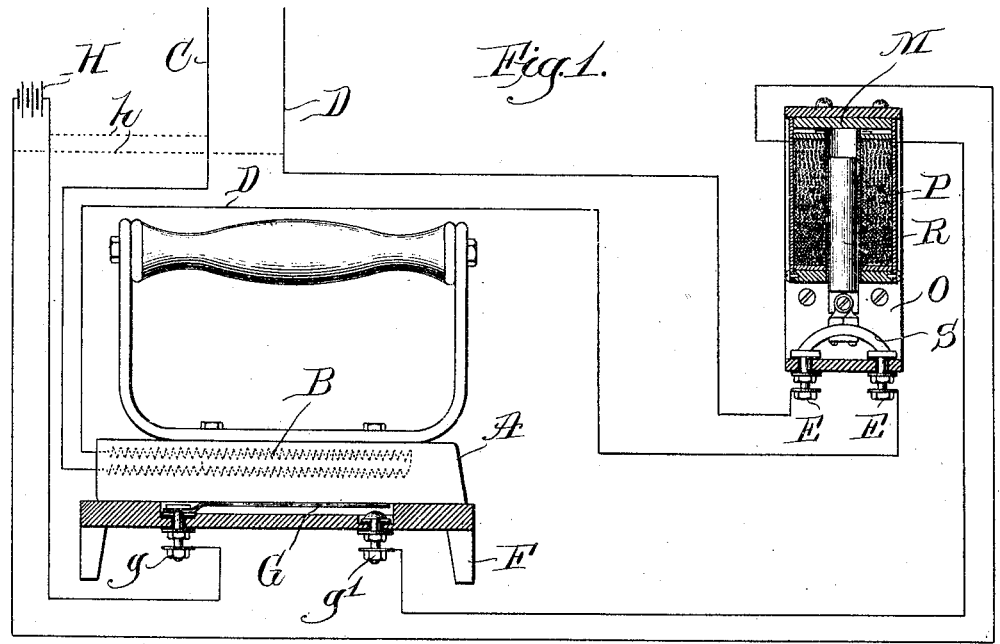

No. 794,580. PATENTED JULY 11, 1905.
J. I. AYER.
AUTOMATIC ELECTRIC HEAT CONTROL.
APPLICATION FILED FEB. 6, 1905.

Witnesses.
Thomas J. Drummond
A. W. Knapp

Inventor.
James I. Ayer,
by Crosby & Gregory
attys.

No. 794,580.                                   Patented July 11, 1905.

UNITED STATES PATENT OFFICE.

JAMES I. AYER, OF CAMBRIDGE, MASSACHUSETTS, ASSIGNOR TO SIMPLEX ELECTRIC HEATING COMPANY, OF BOSTON, MASSACHUSETTS, A CORPORATION OF MASSACHUSETTS.

AUTOMATIC ELECTRIC-HEAT CONTROL.

SPECIFICATION forming part of Letters Patent No. 794,580, dated July 11, 1905.

Application filed February 6, 1905. Serial No. 244,366.

*To all whom it may concern:*

Be it known that I, JAMES I. AYER, a citizen of the United States, residing at Cambridge, county of Middlesex, and State of Massachusetts, have invented an Improvement in Automatic Electric-Heat Control, of which the following description, in connection with the accompanying drawings, is a specification, like letters on the drawings representing like parts.

This invention relates to means for securing automatically the control of the temperature of an electrically-heated tool or other device when at rest, and particularly relates to the control of a movable electrically-heated tool or other device when at rest or temporarily out of service.

A movable electric heater forming part of a movable tool or other device is a well-known instrument. The advantage of such a device lies in the fact that the heat is continually supplied during its use. The chief objection to such a device lies in the fact that it becomes overheated when temporarily out of service if the current is left on, as is necessary in order to have the device ready for immediate use. It is therefore important to have definite control of the heat-supply of the device while it is temporarily out of service in order to maintain it at a predetermined temperature and prevent excessive overheating. The present invention secures this object. When the electrically-heated device is temporarily out of service, it is arranged adjacent a thermostat. When the temperature of the device rises to a predetermined point, the thermostat acts to close an auxiliary or shunt circuit, which thereupon energizes a magnet and operates a switch to open the heater-circuit. The temperature of the device then falls until the thermostat acts to open the auxiliary or shunt circuit, whereupon the magnet is deënergized and the switch operated to close the main circuit, energizing the heater. In this way the tool or other device while out of service is kept substantially at a predetermined temperature constantly. If because of severe duty the tool or other device has been cooled to a considerable extent and it is desired to have it recover its normal or desired temperature by a period of rest, this period is rendered the shortest possible by means of the thermostatic control of this invention, because the device receives the full supply of current until the desired temperature is reached.

The invention is primarily concerned with a movable electrically-heated tool or other device; but in its broadest aspect it is applicable to an electrically-heated device which is not movable.

The nature and extent of the invention will appear more fully from the annexed claims.

The drawings illustrate a specific embodiment of the invention, a flat-iron being shown as the embodiment of the electrically-heated device and particular constructions of thermostat, switch, and magnet being shown; but the invention is not limited in its broader aspects to these details.

Figures 2, 3:
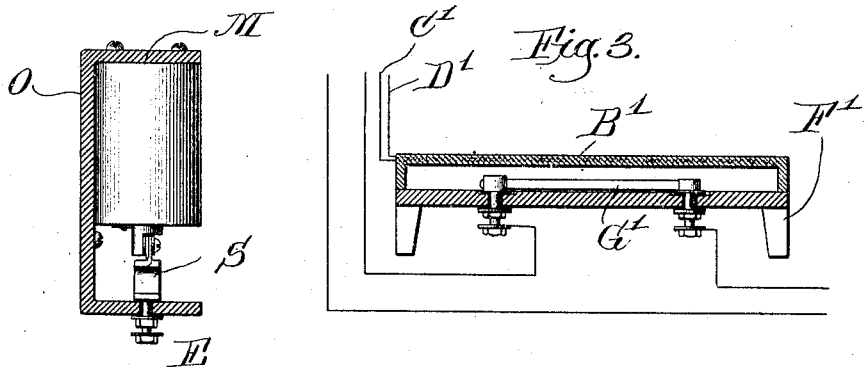
Figure 4:
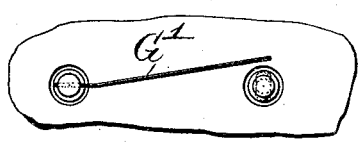

Figure 1 of the drawings represents in front elevation an electrically-heated flat-iron, a stand therefor, a switch, a magnet for controlling the switch, some of the parts being shown in cross-section and the necessary circuits diagrammatically. Fig. 2 is a side elevation, partially in cross-section, of the magnet and switch shown in Fig. 1. Fig. 3 is a front elevation, partially in cross-section, of a heater-stand embodying in itself the heating element, but a portion of the circuits being shown and similarly arranged to those of Fig. 1. Fig. 4 is a top plan view of the thermostat shown in Fig. 3.

In the preferred form of the invention as specifically embodied in a flat-iron, which is typical of any movable tool or device, A represents a flat-iron. The heating element of the flat-iron is shown at B, and it is contained in the main circuit, one wire of which, C, passes to the generator (not shown) and the other wire of which, D, broken at the terminals E E of a switch, passes also to the generator. (Not shown.)

A stand F is shown for supporting the flat-iron when out of service. This stand contains a thermostat, herein shown as a laminated strip of metal and adapted to project normally above the plane of the stand.

One end of the thermostat G is connected with a terminal $g$ of an auxiliary or shunt circuit, and the other end of the thermostat is arranged adjacent to the other terminal $g'$ of the auxiliary or shunt circuit.

The auxiliary or shunt circuit, including the terminals $g$ and $g'$, is energized from a battery H or by a shunt connection (shown in dotted lines at $h$) with the main header-circuit, and it includes also the winding of the magnet M.

The particular form of magnet and switch illustrated and to the details of which the invention is not limited comprises a vertically-disposed casing O. At the lower end the terminals E E, insulated from each other, are mounted in the casing and provided with the usual binding-posts for the connection with the wires C D of the main circuit. In the upper end of the casing is mounted a solenoid-magnet the winding P of which is in series with the auxiliary or shunt circuit and the armature R of which carries at its lower end a switch-bar S.

The operation of the device will be apparent from the foregoing description. The flat-iron, heated by the main circuit, is used in usual manner, the heat being continually supplied through the main circuit.

When the iron is temporarily out of service, it is important that it shall be kept at the desired temperature ready for immediate use. It may also be necessary to allow the iron to rest in order that it may resume its normal working temperature, reduced through the severe duty to which it has been put.

When the iron is placed upon the heater-stand F, the current supplying the heating element B remains on at full strength and the temperature of the iron rises as rapidly as the capacity of the current permits. The proximity of the iron to the thermostat G causes the thermostat to respond readily to the temperature of the iron. The thermostat and the terminal $g'$ are so arranged that when the desired temperature of the iron has been reached the thermostat is deflected sufficiently to make contact with the terminal $g'$, and the auxiliary or shunt circuit is at once completed through the winding P of the magnet M. The terminal $g'$ is made adjustable, so that the temperature at which contact is made may be regulated as desired. Immediately the magnet is energized the armature R raised, carrying with it the switch-bar S, and the main circuit is opened between the terminals E E, cutting off the supply of heat to the iron. The iron then cools until the temperature is such that the thermostat G withdraws from the terminal $g'$, whereupon the auxiliary or shunt circuit is opened, the magnet deënergized, and the armature drops, carrying with it the switch-bar S and closing the main circuit. It will thus be seen that the temperature of the iron is kept at the desired point while temporarily out of service, and if the iron has become unduly cool it is brought to the normal or desired temperature in the quickest possible time. While in this particular embodiment of the invention the thermostat is shown as acting upon a rise in temperature of the electrically-heated device to close an open auxiliary or shunt circuit, resulting in opening the switch in the heater-circuit, it is obvious that the thermostat may be arranged to open a closed auxiliary or shunt circuit and effect the same result.

In Figs. 3 and 4 the heating element is shown at B' as embodied in the construction of the heater-stand F'. The circuit-wires C' D', connected with the heater B', are arranged to make the same connections as the wires C D of the arrangement shown in Fig. 1. A thermostat G' is shown arranged in the heater-stand in proximity to the heated part of the stand and, as illustrated, moves in a horizontal plane. The thermostat is attached at one end to a terminal, to which is attached one branch of an auxiliary or shunt circuit, and is arranged to come into contact with the opposite terminal, to which is attached the opposite branch of an auxiliary or shunt circuit, and is made horizontally adjustable. The wires of the auxiliary or shunt circuit are shown similarly arranged and adapted to make the connections of the arrangement shown in Fig. 1.

By means of the arrangement shown in Figs. 3 and 4 the temperature of the heated part of the stand is automatically maintained at the desired temperature. When the heated part of the stand passes above the desired temperature, it acts upon the thermostat G' to close the auxiliary or shunt circuit, energizes the magnet, and opens the main circuit supplying the heater B'. When the device cools as a result of the opening of the circuit, the thermostat withdraws from the terminal, opening the auxiliary or shunt circuit, deënergizing the magnet, and closing the main circuit.

The invention is primarily directed to the control of a movable electrically-heated device, and most of the claims are limited thereto; but the invention is susceptible of a broader application, as instanced by the construction shown in Figs. 3 and 4, where the tool-heating element is shown in the stationary stand, and for that reason the claims not restricted by the term "movable" involve the invention in its application to a fixed as well as a movable electrically-heated device.

Having described my invention, what I claim as new, and desire to secure by Letters Patent, is—

1. A movable electrically-heated device, an electric circuit supplying said device, a switch for opening and closing said circuit, a stationary regulating device automatically controlled by the temperature of the movable device when placed thereon, said regulating device operating at predetermined temperatures of the device to effect the opening and closing of said switch.

2. A movable electrically-heated device, an electric circuit supplying said device, a switch for opening and closing said circuit, a stationary regulating device automatically controlled by the temperature of the movable device when placed thereon, said regulating device operating at a predetermined temperature of the device to effect the opening of said switch, and operating at a less temperature to effect the closing of said switch.

3. A movable electrically-heated device, an electric circuit supplying said device, a switch for opening and closing said circuit, a stand for said device, a thermostat located in said stand and controlled by the temperature of the movable device when placed thereon, said thermostat operating at predetermined temperatures of the device to effect the opening and closing of said switch.

4. A movable electrically-heated device, an electric circuit supplying said device, a switch for opening and closing said circuit, a stand for said device, a thermostat located in said stand and controlled by the temperature of the movable device when placed thereon, said thermostat operating at a predetermined temperature of the device to effect the opening of the switch, and operating at a less temperature to effect the closing of said switch.

5. A movable electrically-heated device, an electric circuit supplying said device, a switch for opening and closing said circuit, a stand for said device, a thermostat located in said stand and normally projecting above the holding-surface so that when the device is placed upon the stand the thermostat will be in contact with the surface of the device, said thermostat operating at predetermined temperatures of the tool to effect the opening and closing of said switch.

6. A movable electrically-heated device, an electric circuit supplying said device, a switch for opening and closing said circuit, a stand for said device, a thermostat located in said stand and normally projecting above the holding-surface so that when the device is placed upon the stand the thermostat will be in contact with the surface of the device, said thermostat operating at a predetermined temperature of the device to effect the opening of said switch, and operating at a less temperature to effect the closing of said switch.

In testimony whereof I have signed my name to this specification.

JAMES I. AYER.

Witnesses:
NATHAN HEARD,
LOUIS C. SMITH.